United States Patent [19]

Hymes

[11] 4,205,041

[45] May 27, 1980

[54] TAPELESS JOINT COMPOUND

[76] Inventor: Richard H. Hymes, 7416 W. Shore Dr., Minneapolis, Minn. 55435

[21] Appl. No.: 834,284

[22] Filed: Sep. 19, 1977

[51] Int. Cl.$^2$ .................. B32B 31/06; C08L 23/08; C08L 27/06; C08L 31/04

[52] U.S. Cl. .................. 264/261; 260/29.6 RB; 260/42.55; 264/26.3

[58] Field of Search .......... 260/42.55, 29.6 RB; 264/261, 263

[56] References Cited

U.S. PATENT DOCUMENTS

| | | | |
|---|---|---|---|
| 3,708,388 | 1/1973 | Lindemann et al. | 260/17 A X |
| 3,830,761 | 8/1974 | Lenney | 260/8 |
| 3,844,990 | 10/1974 | Lindemann et al. | 260/42.55 |
| 3,867,335 | 2/1975 | Reed et al. | 260/42.55 X |
| 3,907,725 | 9/1975 | Forte et al. | 260/42.55 X |

*Primary Examiner*—Sandra M. Person
*Attorney, Agent, or Firm*—Orrin M. Haugen; Thomas J. Nikolai

[57] ABSTRACT

A curable formulation for application to dry wall surfaces and for jointing and filling dry wall panels. The formulation utilizes an internally plasticized vinyl acetate-ethylene copolymer or alternatively, vinyl acetate-ethylene vinyl chloride interpolymers along with fillers and additives such as suspending agents, defoamers, emulsifiers, and thickeners. The formulation is stable in aqueous suspensions.

5 Claims, No Drawings

TAPELESS JOINT COMPOUND

BACKGROUND OF THE INVENTION

The present invention relates generally to a formulation which is adapted for application to dry wall surfaces, and also for the jointing and filling of dry wall panels. The formulation has excellent adhesive and cohesive properties, and is specifically designed for adhering to gypsum dry wall panels. The binder or film-forming material is internally plasticized so as to provide durability, resistance to cracking, checking, or other such failures over extended periods of time.

In the building industry, dry wall construction is being widely used due to its ease of application, versatility, and lack of extended drying or curing times frequently encountered when wet plaster finishes are contemplated. Dry wall panels utilize a gypsum core with a finish or outer coating of fiberboard or the like. Dry wall panels are, of course, widely commercially available.

In conventional construction, dry wall panels are mounted onto unfinished walls, and thereafter are treated so as to cover or fill the joint existing between adjacent panels. Presently, a hydrosettable filler is normally utilized, with these materials always requiring a taping layer to be applied thereover so as to reduce the tendency of the filler material to crack upon drying. Some such materials cure at least partially through evaporation of water. Shrinkage of the normal filler material will inherently occur, and after extended periods of time, cracks appear in the joint area.

A further disadvantage in the conventional jointing and filling of dry wall panels is the requirement that the joint area receive multiple layers or coatings, with the final coating requiring sanding so as to smooth the appearance of the joint. Such operations are, of course, required in order to conceal recessed nails which are normally, at least in the joint area, driven into the panel with a crushing blow. The area surrounding the nail head is frequently indented by the final blow of the hammer, and hence these areas must be covered in order to render the wall surface more smooth and sightly.

Following the application of the jointing and filling compound, the surface of the dry wall panels is ready to receive a coat of paint, as required or desired.

The dry wall industry has had a long-felt need for a jointing and filling compound which is easily applied, and which does not require the utilization of a tape to avoid the cracking tendency. Furthermore, any such formulation which would not require taping would also desirably be sandable to a degree.

Dry wall panels normally have edge surfaces which are tapered inwardly along the outside surface. This tapering or "feathering" is provided in order to accommodate a jointing and filling compound, along with the conventional tape. The formulation of the present invention has excellent adhesive and cohesive properties, thereby permitting the material to be applied to the dry wall panel surface in relatively thin layers.

In addition to use as a dry wall filler and jointing compound, the formulations of the present invention may also be utilized as a coating, either in smooth or textured form. In other words, the formulations may be modified only slightly, such as by increased or decreased use of water so as to enable the formulation to be utilized as a jointer and filler material, and thereby applied with a conventional trowel or knife, or alternatively, as a wall surface coating and accordingly applied with a conventional paint roller or brush as desired.

SUMMARY OF THE INVENTION

Therefore, it is a primary object of the present invention to provide an improved dry wall treating composition which is adapted for use as a jointing-filler composition, and also as a paint, which formulation utilizes an internal plasticized film-forming material stable in aqueous dispersion.

It is yet a further object of the present invention to provide an improved formulation for application to dry wall surfaces and for jointing and filling dry wall panels, the formulation utilizing an internally plasticized vinyl acetate-ethylene material which is internally plasticized so as to resist cracking and checking upon curing.

It is yet a further object of the present invention to provide an improved curable formulation for application to dry wall surfaces and for jointing and filling of dry wall panels, the formulation utilizing a film-forming material which is internally plasticized, and which further employs fillers along with certain additives such as suspending agents, defoamers, emulsifiers, and thickeners, which formulation is stable in aqueous dispersions.

Other and further objects of the present invention will become apparent to those skilled in the art upon a study of the following specification and appended claims.

DESCRIPTION OF THE PREFERRED EMBODIMENT

As has been indicated, the formulations of the present invention employ an internally plasticized vinyl acetate-ethylene copolymer. These copolymers are commercially available, and their preparation disclosed in U.S. Pat. Nos. 3,708,388 and 3,844,990. The internally plasticized feature is provided by the utilization of crosslinking elements in the polymer which are chemically integrated into the polymer, but yet offer flexibility because of their composition. These materials are distinguishable from externally plasticized systems which utilize a material which may become fugitive to the polymer after extended periods of exposure to ambient.

In addition to internally plasticized vinyl acetate-ethylene copolymers, it has been found that vinyl acetate-ethylene-vinyl chloride interpolymers may also be employed. Such interpolymers as well as the method of preparation are disclosed in U.S. Pat. No. 3,830,761.

In addition to the binder material, fillers in the form of calcium carbonate, mica, perlite, or other inert finely-divided solids may be employed. It has been found that the utilization of an internally plasticized material permits the utilization of larger quantities of fillers, thereby enhancing the overall and ultimate stability of the material upon drying or curing. Suspension agents, defoamers, as well as thickeners may be utilized if desired.

As has been indicated, the formulations provide a working mixture or working suspension which may be applied to the surfaces of dry wall panels, either as a finish material or as a filler-jointing material. The strength and flexibility of the cured product is sufficient so as to eliminate cracking or crazing, and yet is capable of being sanded with conventional sandpaper.

For a more complete comprehension of the invention, the following formulations are given as typical and illustrative.

EXAMPLE 1

In order to prepare a formulation which is adapted for use a jointing-filler material, the following formulation is given:

| Ingredient | Amount |
| --- | --- |
| Internally plasticized vinyl-acetate-ethylene copolymer; latex emulsion (55% solids in aqueous solution) | 110 gallons (1001 lbs.) |
| Sodium salt of polymeric carboxylic acid | 20 lbs. |
| Defoamer | 10 lbs. |
| Calcium carbonate powder | 4050 lbs. |
| Mica, pulverized powder | 375 lbs. |
| CMP acetate | 1 lb. |
| Cellulose | 24.5 lbs. |
| Water | 115 gallons | in the above formulation, the suspension agent may be selected from any of a variety of commercial materials, although the sodium salt of polymeric carboxylic acid available under the designation "Tamol 850" of Rohm and Haas Company of Philadelphia, Pennsylvania has been found useful.

As a defoamer, "Troykyd Powder Defoamer 262" available from Troy Chemical Corp. of Newark, New Jersey may be utilized, although other conventional defoamers may be found useful. Other defoamers which are formed by the addition of propylene oxide to ethylene diamine followed by the addition of ethylene oxide may also be used, such materials being available under the code name "Tetronic" from BASF Wyandotte Chemicals Corporation of Wyandotte, Michigan may be utilized.

The CMP acetate is utilized to retard growth of organisms which may otherwise thrive in the cellulose product utilized. The cellulose employed may be that formulation sold under the designation "250 HHXR Natrosol", available from Hercules Inc. of Wilmington, Delaware.

As has been indicated, the formulation of Example 1 may be applied directly to dry wall panels as a jointing and filling material. Upon drying, the material may be sanded with conventional sandpaper and only one additional application is normally required. Inasmuch as internally plasticized binders are employed, the material remains flexible and thus neither cracks nor crazes upon extended periods of exposure to the ambient. Tests have indicated that the material will bend, without cracking, and will further stretch up to 1/16th inch in modest thicknesses without fracturing.

Use of fibrous fillers is not required, and accordingly the presence of undesirable quantities of fiberglass, asbestos, or the like which pose potential hazards to users are avoided.

EXAMPLE 2

The following formulation has been found desirable as a smooth wall texture coating, particularly adapted for coating on dry wall surfaces:

| Ingredient | Amount |
| --- | --- |
| Internally plasticized vinyl-acetate-ethylene copolymer; latex emulsion (55% solids in aqueous solution) | 90 gallons |
| Sodium salt of polymeric carboxylic acid | 20 lbs. |
| Defoamer | 10 lbs. |
| Calcium carbonate powder (12 micron mean particle size) | 4200 lbs. |
| Ground mica particles (mean size 15 microns) | 200 lbs. |
| CMP acetate | 1 lb. |
| Cellulose | 20 lbs. |
| Water | 110 gallons |

This material has been found to have excellent film-forming properties, and forms an excellent coating for dry wall surfaces. Colors and other pigments may be employed as desired.

EXAMPLE 3

The following material has been found desirable as a ceiling texture:

| Ingredient | Amount |
| --- | --- |
| Internally plasticized vinyl-acetate-ethylene copolymer; latex emulsion (55% solids in aqueous solution) | 55 gallons |
| Sodium salt of polymeric carboxylic acid | 20 lbs. |
| Defoamer | 10 lbs. |
| Calcium carbonate powder (mean particle size 12 microns) | 3200 lbs. |
| Ground mica (mean particle size 15 microns) | 200 lbs. |
| CMP acetate | 1 lb. |
| Perlite (50% through 12 mesh screen) | 87 lbs. |
| Cellulose | 22 lbs. |
| Water | 160 gallons |

The above material has desirable properties as a ceiling texture, and provides good adhesion and cohesion for such application.

EXAMPLE 4

The following material has been found desirable as a texture material to be applied to plastic foam (foamed polystyrene) panels and also may be used as a crack cover:

| Ingredient | Amount |
| --- | --- |
| Internally plasticized vinyl-acetate-ethylene copolymer; latex emulsion (55% solids in aqueous solution) | 360 gallons |
| Sodium salt of polymeric carboxylic acid | 10 lbs. |
| Defoamer | 10 lbs. |
| CMP acetate | 1 lb. |
| Titanium dioxide (2 micron mean particle size) | 160 lbs. |
| "Attagel 50" Attapulgus Clay (average particle size 14 micron) (available from Engelhard Minerals and Chemicals of Edison, New Jersey) | 270 lbs. |

This material is desirable for use as a texture product to be applied to surfaces of foamed polystyrene, with such material being utilized more widely in the building industry.

GENERAL DISCUSSION

As has been indicated, interpolymers of vinyl acetate-ethylene-vinyl chloride may be employed. These materials, when utilized, will be substituted on a 1:1 basis for the vinyl acetate-ethylene copolymers described above. They are internally plasticized by virtue of the ethylene moiety, and thereby retain flexibility over extended periods of time. It is this ethylene moiety which provides the internal plasticization for both the vinyl acetate-ethylene copolymers and vinyl acetate-ethylene-vinyl chloride interpolymers.

The primary purpose of the present invention is to provide a jointing and filling compound for dry wall panels, the invention including the recognition that internally plasticized binders may be employed for this purpose, and with the vinyl acetate-ethylene copolymers providing a surface which is flexible and durable, and also sandable with conventional sandpaper materials.

The internally plasticized vinyl acetate-ethylene copolymer emulsions may be employed in an amount ranging from between about 5%-25%, and are normally coupled with water in an amount representing between about 15% and 40%, based upon the total product weight. The suspension agent is desirable for maintaining the suspension over extended periods of time. Defoamers are conventionally used for avoiding bubbling or frothing of the material upon use. The fillers, as previously indicated, may be utilized in rather heavy quantities, thereby contributing to desirable economic advantages, as well as resistance to crazing and cracking.

I claim:

1. An ambient curable cohesive self-supporting formulation for application to wall panels and for curing thereon, and consisting of a flowable mixture of an internally plasticized binder selected from the group consisting of vinyl acetate-ethylene copolymers and vinyl acetate-ethylene-vinyl chloride interpolymers together with inert fillers and water, with said binder solids comprising between about 2% and 13% by total weight of the formulation.

2. The method of treating the surfaces of wall panels which includes the following:
   (a) preparing a curable formulation consisting of an internally plasticized fluid binder curable upon exposure to the ambient and selected from the group consisting of vinyl acetate-ethylene copolymers and vinyl acetate-ethylene-vinyl chloride interpolymers together with inert fillers and water, with said binder solids comprising between about 2% and 13% by total weight of the formulation;
   (b) applying said curable formulation to the surface of a wall along and over the edges of adjoining wall panels; and
   (c) permitting said curable formulation to air-cure in the ambient.

3. The method as defined in claim 2 being particularly characterized in that said wall panels are gypsum dry wall panels.

4. The method as defined in claim 2 being particularly characterized in that said wall panels are foamed synthetic resin wall panels.

5. The method as defined in claim 2 being particularly characterized in that said wall panels are individual panels, and wherein said curable formulation is applied between the mutually adjacent wall panels.

* * * * *